United States Patent [19]

Holder

[11] Patent Number: 5,065,621

[45] Date of Patent: Nov. 19, 1991

[54] VISUALLY ENHANCED WEATHER VANE APPARATUS

[76] Inventor: Jon A. Holder, P.O. Box 481, Westminster, Md. 21157

[21] Appl. No.: 519,066

[22] Filed: May 3, 1990

[51] Int. Cl.$^5$ .............................................. G01P 13/02
[52] U.S. Cl. ........................................ 73/188; 40/440
[58] Field of Search ................... 73/188, 189, 861.85; 40/440, 441, 422, 412, 430, 431, 479, 480; 446/199, 201

[56] References Cited

U.S. PATENT DOCUMENTS

| | | |
|---|---|---|
| D. 176,972 | 2/1956 | Bennett . |
| 1,374,921 | 4/1921 | Houston ................................ 40/430 |
| 1,814,995 | 7/1931 | Winer et al. ........................... 40/431 |
| 2,061,189 | 11/1936 | Dungan . |
| 2,096,884 | 10/1937 | Dietlein ................................ 40/430 |
| 3,010,315 | 11/1961 | Leslie . |
| 3,220,253 | 11/1965 | Parker . |
| 4,870,768 | 10/1989 | Watt et al. ............................ 40/430 |

Primary Examiner—Charles A. Ruehl

[57] ABSTRACT

A visually enhanced weather vane apparatus (10) for producing a pair of different and sequential pictorial representations (26) on opposite sides of the apparatus (10) by virtue of a plurality of interconnected visual segment units (12) being rotatably suspended within a framework member (16) wherein the visual segment units (12) are operatively and rotatably connected to the drive gear of a drive axle (31) powered by a wind driven propeller (30).

3 Claims, 2 Drawing Sheets

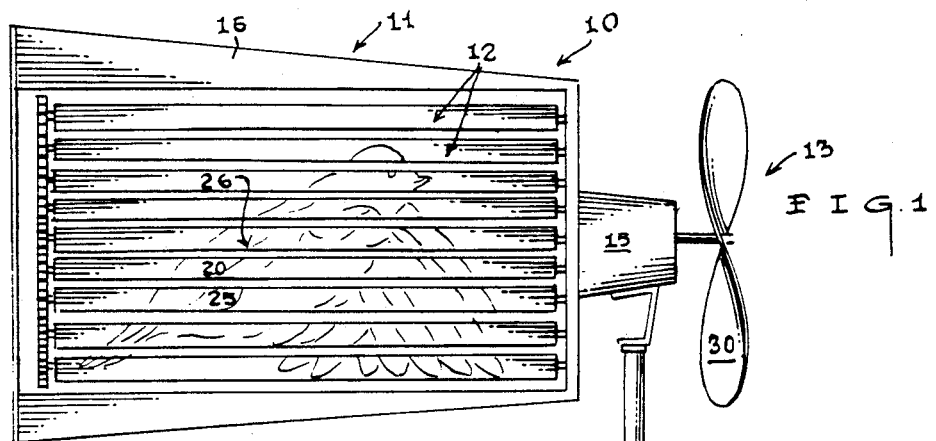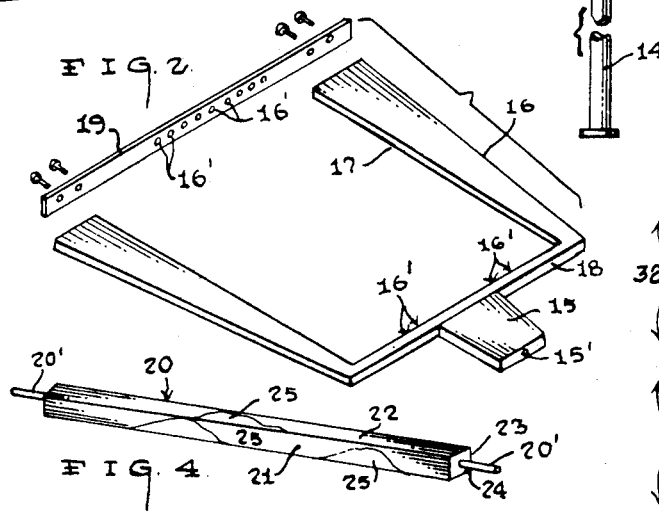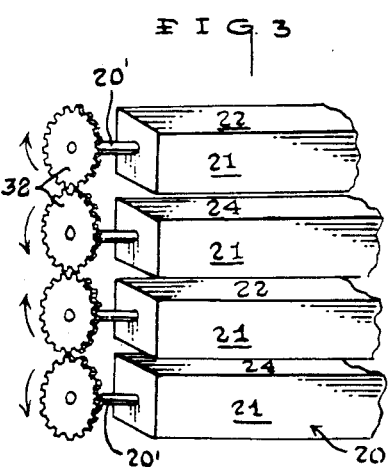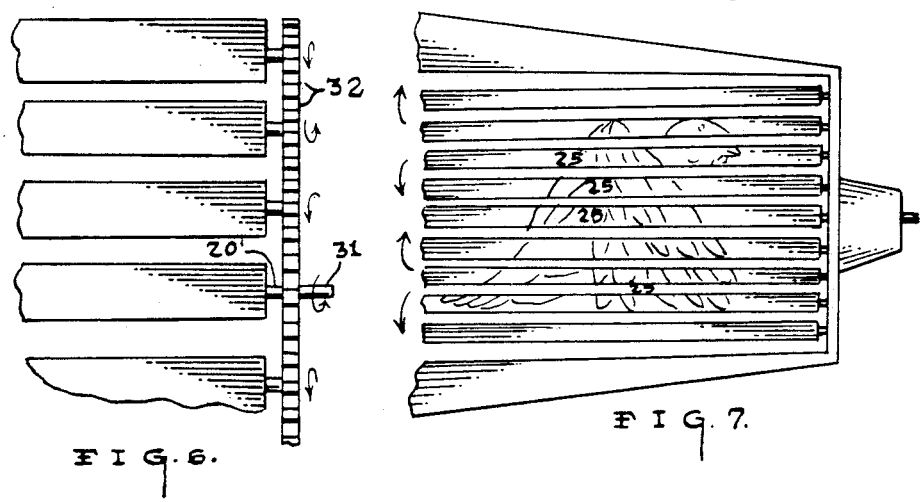

VISUALLY ENHANCED WEATHER VANE APPARATUS

TECHNICAL FIELD

The present invention relates to the field of weather vanes in general, and in particular to a weather vane that has a plurality of changing pictorial segments which produce a moving image as the segments rotate.

BACKGROUND ART

As can be seen by reference to the following U.S. Pat. Nos. D176,972; 2,061,189; 3,010,315; and 3,220,253; the prior art is replete with myriad and diverse weather vane constructions which employ moving visual components.

While all of the aforementioned prior art constructions are more than adequate for the basic purpose and function for which they have been specifically designed, these patented devices do not duplicate a simulated moving picture arrangement such as is provided by the present invention.

In addition, virtually all of the prior art devices utilize totally exposed components whose viable appearance is not substantially changed as the components move. In the present invention, each component is only partially revealed at any given time and is representative of a portion or segment of an everchanging visual picture.

As a consequence of the foregoing situation, there has existed a longstanding need for a new and unique arrangement for weather vanes which provide an enhanced visual image which simulates a moving picture and, the provision of such a construction is a stated objective of the present invention.

DISCLOSURE OF THE INVENTION

Briefly stated, the visually enhanced weather vane apparatus that forms the basis of the present invention comprises a support unit having a plurality of visual segments units and a drive unit which will impart counter rotating movement to the adjacent visual segment units to produce a simulated moving picture on at least one side of the apparatus.

In addition, this invention also contemplates dual groupings of the visual segment units in aligned vertical rows whereby a coherent image will be produced on the external surfaces on both sides of the apparatus.

As will be explained in greater detail further on in the specification, each of the visual segment units has four elongated sides and each side contains different portions of a complete pictorial representation, whereby four different pictures will be produced as the respective sides are brought into vertical alignment with one another.

In addition, in the preferred embodiment of this invention, the four pictorial representations are sequential images that are intended to produce the illusion of motion.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a side view of the apparatus showing one pictorial representation;

FIG. 2 is an exploded perspective view of the framework support member;

FIG. 3 is a perspective end view of one version of the visual segment unit;

FIG. 4 is an isolated detail view of one of the visual segment units;

FIG. 6 is a side plan view showing the meshed engagement of the gears of the apparatus; and FIG. 7 is a side view of the apparatus showing another pictorial representation.

BEST MODE FOR CARRYING OUT THE INVENTION

Figure 5:
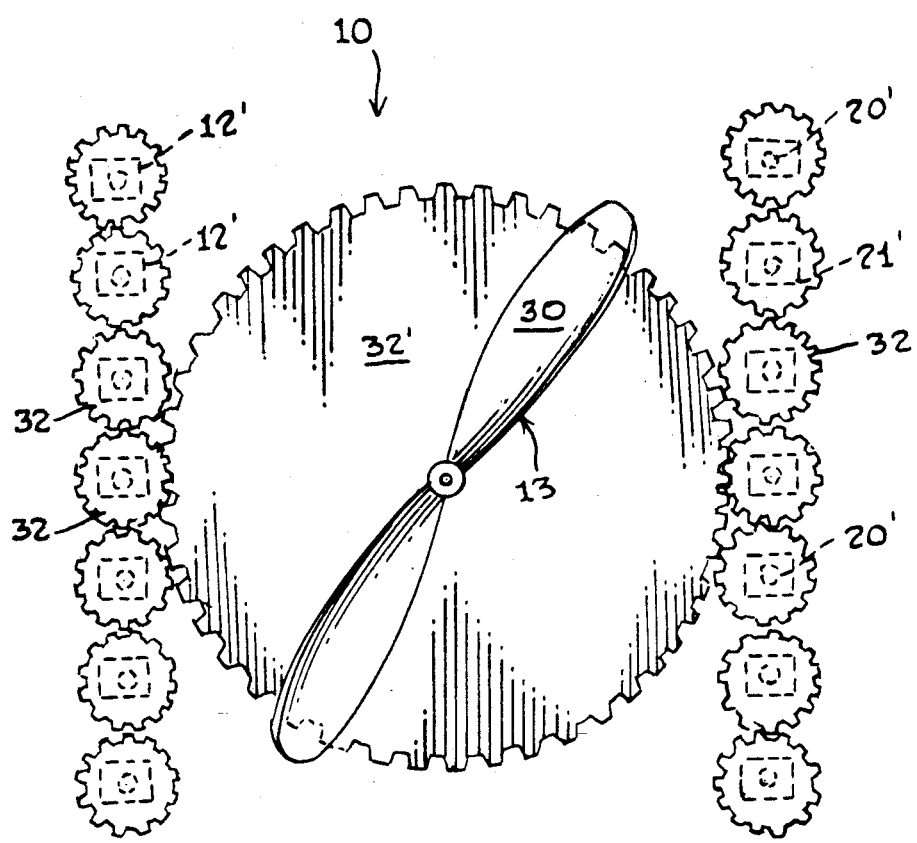
FIG. 5 is an end view of another version of the visual segment units.

As can be seen by reference to the drawings, and in particular to FIG. 1, the visually enhanced weather vane apparatus that forms the basis of the present invention is designated generally by the reference numeral (10). The apparatus (10) comprises in general, a support unit (11), a plurality of visual segment units (12) and a drive unit (13). These units will now be described in seriatim fashion.

As can best be seen by reference to FIGS. 1 and 2, the support unit (11) comprises an elongated vertical support column (14) provided on the upper end with a pivotally attached axle housing member (15) having an axial bore (15') which is operatively attached to a generally rectangular open framework member (16).

The framework member (16) comprises a generally U-shaped main frame element (17) having a plurality of generally shallow recesses (16') formed in the base (18) of the mainframe element (17). The base (18) of the mainframe element (17) is further provided with an extension of the axial bore (15').

In addition, the framework member (16) is further provided with an end cap element (19) which is secured across the open end of the U-shaped mainframe element (17). The end cap element (19) is also provided with a plurality of shallow recesses (16') which are aligned with the recesses in the mainframe element (17).

As can best be seen by reference to FIGS. 1, 3 and 4, the plurality of visual segment units (12) each comprise an elongated rectangular visual component member (20) having axle stubs (20') formed on its opposite ends. Each of the elongated sides (21, 22, 23, 24) have a portion (25) of a pictorial representation designated generally as (26) in the form of a bird, or other suitable object.

As shown in FIGS. 1 and 3, the drive unit (13) of the preferred embodiment comprises in general a propeller (30) mounted an drive axle (31) which extends through the axle housing (15) and is operatively engaged with one of the axle stubs (20'). In addition, all of the axle stubs (20') are further provided with interconnection drive gears (32). The rotation of the axle mounted drive gear (32') will engage at least one of the other interconnected drive gears (32) to produce counter revolutionary movement between the interconnected drive gears (32).

In the alternate embodiment depicted in FIG. 5, the apparatus (10) comprises a pair of vertically aligned rows of visual segment units (12') each equipped with axle stubs (20') having interconnected drive gears (32). The axle mounted drive gear (32') is disposed between and operatively engaged with at least one drive gear (32) in each of the pair of vertically aligned rows of visual segment units (12') such that coherent images are being formed on the external surfaces on both rows of visual segment units (12').

As can best be appreciated by reference to FIGS. 1, 3 and 6, due to the counter revolutionary movement of the adjacent elongated rectangular visual component members (20) each of the adjacent visual components have their portions (25) of a given pictorial representation (26) arranged in reverse order (e.g. sides 21, 22, 23, 24) versus sides (21, 24, 23, 22) in both version of the preferred embodiment.

As can best be appreciated by reference to FIG. 3, when sides (21) produce one coherent image (26) on one side of the apparatus (10), sides (23) will be producing a slightly different coherent image (26') on the other sides of the apparatus (10).

Having thereby described the subject matter of the present invention, it should be apparent that many substitutions and variations of the invention are possible in light of the above teachings. It is therefore to be understood that the invention as taught and described herein is only to be limited to the extent of the breadth and scope of the appended claims.

I claim:

1. A visually enhanced weather vane apparatus comprising:

a vertical support column;

an axle housing member having an axial bore wherein the axle housing member is pivotally connected to said support column;

a generally rectangular framework member operatively attached to said axle housing member;

a plurality of visual segment units rotatably suspended within said framework member wherein each visual segment unit comprises an elongated rectangular visual component member, wherein each of the four elongated sides of the individual visual component members have a portion of four different pictorial representations; and means for imparting rotary movement to the plurality of visual segment units for producing a different pictorial representation on each side of the apparatus.

2. The apparatus as in claim 1 wherein the means for imparting rotary movement comprises:

a propeller mounted on a drive axle which extends through the axle housing member; and a drive gear attached to the drive axle and being operatively connected to the visual segment units for imparting rotary movement to the said visual segment units.

3. The apparatus as in claim 2 wherein the operative connection betwen the visual segment units and the drive gear comprises a plurality of interconnected drive gears wherein each of the plurality of interconnected drive gears is operatively associated with one of the said plurality of visual segment units.

* * * * *